United States Patent
Spanel et al.

(10) Patent No.: US 9,226,133 B1
(45) Date of Patent: Dec. 29, 2015

(54) DYNAMIC REMOTELY MANAGED SIM PROFILE

(71) Applicant: Sprint Communications Company L.P., Overland Park, KS (US)

(72) Inventors: Robert L. Spanel, Overland Park, KS (US); Robert E. Urbanek, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/522,586

(22) Filed: Oct. 24, 2014

Related U.S. Application Data

(63) Continuation of application No. 13/744,847, filed on Jan. 18, 2013, now Pat. No. 8,909,291.

(51) Int. Cl.
*G06F 15/16* (2006.01)
*H04W 8/18* (2009.01)

(52) U.S. Cl.
CPC ........................................ *H04W 8/18* (2013.01)

(58) Field of Classification Search
USPC ................................. 455/410, 411, 414.1, 558
See application file for complete search history.

(56) References Cited

U.S. PATENT DOCUMENTS

| | | | |
|---|---|---|---|
| 6,131,024 A | 10/2000 | Boltz | |
| 7,165,191 B1 | 1/2007 | Vakrat | |
| 7,266,371 B1 | 9/2007 | Amin et al. | |
| 7,493,111 B2 | 2/2009 | Knowles | |
| 7,817,988 B2 | 10/2010 | Kruis et al. | |
| 7,904,895 B1 | 3/2011 | Cassapakis et al. | |
| 8,107,926 B2 | 1/2012 | Goto | |
| 8,185,101 B1 | 5/2012 | Wiseman et al. | |
| 8,260,281 B2 | 9/2012 | Urbanek | |
| 8,401,538 B2 | 3/2013 | Urbanek | |
| 8,401,595 B2 | 3/2013 | Zhu et al. | |
| 8,433,953 B1 | 4/2013 | Gaudette et al. | |
| 8,442,521 B2 | 5/2013 | Fleischman et al. | |
| 8,571,536 B2 | 10/2013 | Urbanek | |
| 8,612,967 B1 | 12/2013 | Delker | |
| 8,626,165 B1 | 1/2014 | Narasimhan et al. | |
| 8,666,383 B1 | 3/2014 | Mauer et al. | |

(Continued)

FOREIGN PATENT DOCUMENTS

WO 2012078753 A1 6/2012
WO 2013169983 A1 11/2013

(Continued)

OTHER PUBLICATIONS

Notice of Allowance dated Apr. 26, 2012, U.S. Appl. No. 12/962,620, filed Dec. 7, 2010.

(Continued)

*Primary Examiner* — Sam Bhattacharya

(57) ABSTRACT

A method for managing device profiles is provided. The method comprises adding at least one alternative primary profile to a memory module at an alternative address different from a main address of a main primary profile. The method further comprises modifying a pointer that points to an address in the memory module from which a profile is retrieved such that the pointer points to the alternative address. The main primary profile comprises a main device identifier and a main authentication key, and the alternative primary profile comprises an alternative device identifier and an alternative authentication key.

20 Claims, 7 Drawing Sheets

(56) References Cited

U.S. PATENT DOCUMENTS

| | | |
|---|---|---|
| 8,825,039 B2 | 9/2014 | Mizuguchi |
| 8,909,291 B1 | 12/2014 | Spanel et al. |
| 9,026,105 B2 | 5/2015 | Shipley et al. |
| 9,042,877 B1 | 5/2015 | Ghoshal et al. |
| 2002/0091931 A1 | 7/2002 | Quick, Jr. et al. |
| 2003/0217145 A1 | 11/2003 | Leung et al. |
| 2004/0033798 A1 | 2/2004 | Robin et al. |
| 2004/0092248 A1 | 5/2004 | Kelkar et al. |
| 2004/0093109 A1 | 5/2004 | O'Connor et al. |
| 2004/0116163 A1 | 6/2004 | Kim et al. |
| 2004/0137890 A1 | 7/2004 | Kalke |
| 2004/0137891 A1 | 7/2004 | Clark et al. |
| 2004/0261041 A1 | 12/2004 | Parakkuth et al. |
| 2005/0079855 A1 | 4/2005 | Jethi et al. |
| 2005/0085222 A1 | 4/2005 | Przybilski et al. |
| 2005/0119001 A1 | 6/2005 | Watanabe |
| 2005/0188262 A1 | 8/2005 | Rosenman et al. |
| 2005/0197098 A1 | 9/2005 | Trossen |
| 2006/0025151 A1 | 2/2006 | Karaoguz et al. |
| 2006/0135144 A1 | 6/2006 | Jothipragasam |
| 2006/0154651 A1 | 7/2006 | Knowles |
| 2006/0203722 A1 | 9/2006 | Oommen |
| 2006/0208071 A1 | 9/2006 | Chang et al. |
| 2006/0235944 A1 | 10/2006 | Haslam |
| 2006/0236325 A1 | 10/2006 | Rao et al. |
| 2006/0246949 A1 | 11/2006 | Gupta et al. |
| 2007/0004404 A1 | 1/2007 | Buckley et al. |
| 2007/0082655 A1 | 4/2007 | Link, II et al. |
| 2007/0099599 A1 | 5/2007 | Smith et al. |
| 2007/0129057 A1 | 6/2007 | Xu et al. |
| 2007/0130156 A1 | 6/2007 | Tenhunen et al. |
| 2007/0165654 A1 | 7/2007 | Chai et al. |
| 2007/0169084 A1 | 7/2007 | Frank et al. |
| 2007/0190939 A1 | 8/2007 | Abel |
| 2007/0197234 A1 | 8/2007 | Gill et al. |
| 2007/0250645 A1 | 10/2007 | Meadows et al. |
| 2007/0254635 A1 | 11/2007 | Montelius |
| 2008/0039114 A1 | 2/2008 | Phatak et al. |
| 2008/0046583 A1 | 2/2008 | Rao |
| 2008/0046880 A1 | 2/2008 | Jun et al. |
| 2008/0046997 A1 | 2/2008 | Wang |
| 2008/0062900 A1 | 3/2008 | Rao |
| 2008/0065753 A1 | 3/2008 | Rao |
| 2008/0109662 A1 | 5/2008 | Natarajan et al. |
| 2008/0146280 A1 | 6/2008 | Sasse et al. |
| 2008/0167027 A1 | 7/2008 | Gautier et al. |
| 2008/0171532 A1 | 7/2008 | Shieh et al. |
| 2008/0225806 A1 | 9/2008 | Arian et al. |
| 2008/0281511 A1 | 11/2008 | Miyata |
| 2008/0318547 A1 | 12/2008 | Ballou, Jr. et al. |
| 2009/0061840 A1 | 3/2009 | Fleischman et al. |
| 2009/0093242 A1 | 4/2009 | Bhalekar et al. |
| 2009/0094350 A1 | 4/2009 | Rive et al. |
| 2009/0106200 A1 | 4/2009 | Salinas et al. |
| 2009/0124250 A1 | 5/2009 | Topaltzas et al. |
| 2009/0156209 A1 | 6/2009 | Franklin et al. |
| 2009/0239518 A1 | 9/2009 | Feuillette |
| 2009/0247124 A1 | 10/2009 | de Atley et al. |
| 2009/0260004 A1 | 10/2009 | Datta et al. |
| 2009/0307763 A1 | 12/2009 | Rawlins et al. |
| 2010/0048193 A1 | 2/2010 | Ortion et al. |
| 2010/0060456 A1 | 3/2010 | Forster |
| 2010/0075669 A1 | 3/2010 | Sparks et al. |
| 2010/0080143 A1 | 4/2010 | Topaltzas et al. |
| 2010/0133335 A1 | 6/2010 | Maguid et al. |
| 2010/0136960 A1 | 6/2010 | Knezevic |
| 2010/0159876 A1 | 6/2010 | Brown et al. |
| 2010/0161724 A1 | 6/2010 | Sathyan et al. |
| 2010/0167696 A1 | 7/2010 | Smith et al. |
| 2010/0192120 A1 | 7/2010 | Raleigh |
| 2010/0203864 A1 | 8/2010 | Howard |
| 2010/0207742 A1 | 8/2010 | Buhot et al. |
| 2010/0222047 A1 | 9/2010 | Vanderlinden et al. |
| 2010/0262638 A1 | 10/2010 | Fitzgerald |
| 2010/0291898 A1 | 11/2010 | Sanding et al. |
| 2010/0311404 A1 | 12/2010 | Shi et al. |
| 2010/0312794 A1 | 12/2010 | Liu |
| 2010/0325622 A1 | 12/2010 | Morton |
| 2010/0332639 A1 | 12/2010 | Diaz et al. |
| 2011/0003590 A1 | 1/2011 | Yoon et al. |
| 2011/0014913 A1 | 1/2011 | Yoon et al. |
| 2011/0026501 A1 | 2/2011 | Sharaga et al. |
| 2011/0028138 A1 | 2/2011 | Davies-Moore et al. |
| 2011/0030062 A1 | 2/2011 | Hsu et al. |
| 2011/0035421 A1 | 2/2011 | Laird-McConnell et al. |
| 2011/0081885 A1 | 4/2011 | Sennett et al. |
| 2011/0119716 A1 | 5/2011 | Coleman, Sr. |
| 2011/0138074 A1 | 6/2011 | Onda et al. |
| 2011/0161659 A1 | 6/2011 | Himawan et al. |
| 2011/0165836 A1 | 7/2011 | Dixon et al. |
| 2011/0208338 A1 | 8/2011 | Eteminan et al. |
| 2011/0222404 A1 | 9/2011 | Watson et al. |
| 2011/0230136 A1 | 9/2011 | Washiro |
| 2011/0258249 A1 | 10/2011 | Biggs et al. |
| 2011/0263294 A1 | 10/2011 | Kim et al. |
| 2011/0296399 A1 | 12/2011 | Tugnawat et al. |
| 2011/0306318 A1 | 12/2011 | Rodgers et al. |
| 2011/0314129 A1 | 12/2011 | Rezaiifar et al. |
| 2012/0027059 A1 | 2/2012 | Zhao et al. |
| 2012/0036282 A1 | 2/2012 | Chen et al. |
| 2012/0046022 A1 | 2/2012 | Kalke et al. |
| 2012/0047227 A1 | 2/2012 | Haggerty et al. |
| 2012/0094684 A1 | 4/2012 | Reddy |
| 2012/0106509 A1 | 5/2012 | Klingenbrunn et al. |
| 2012/0129513 A1 | 5/2012 | van der Laak |
| 2012/0129572 A1 | 5/2012 | Johnstone et al. |
| 2012/0135733 A1 | 5/2012 | Cormier et al. |
| 2012/0158580 A1 | 6/2012 | Eram et al. |
| 2012/0203824 A1 | 8/2012 | Oommen |
| 2012/0208511 A1 | 8/2012 | Vanderlinden et al. |
| 2012/0230587 A1 | 9/2012 | Arseneau |
| 2012/0260095 A1 | 10/2012 | Von Hauck et al. |
| 2012/0276872 A1 | 11/2012 | Knauth et al. |
| 2012/0282891 A1 | 11/2012 | Mohammed et al. |
| 2012/0282924 A1 | 11/2012 | Tagg et al. |
| 2013/0023235 A1 | 1/2013 | Fan et al. |
| 2013/0031191 A1 | 1/2013 | Bott |
| 2013/0031234 A1 | 1/2013 | Alfano et al. |
| 2013/0046951 A1 | 2/2013 | Jones |
| 2013/0065578 A1 | 3/2013 | Raleigh et al. |
| 2013/0072168 A1 | 3/2013 | Colucciello et al. |
| 2013/0085914 A1 | 4/2013 | McPherson et al. |
| 2013/0111461 A1 | 5/2013 | Zubas et al. |
| 2013/0198567 A1 | 8/2013 | Ahmed et al. |
| 2013/0222395 A1 | 8/2013 | Blas, JR. |
| 2013/0303142 A1 | 11/2013 | Burcham et al. |
| 2013/0310003 A1 | 11/2013 | Sadhvani et al. |
| 2013/0311836 A1 | 11/2013 | Hurst Cameron et al. |
| 2014/0045483 A1 | 2/2014 | Whidden Verne William |
| 2014/0080467 A1 | 3/2014 | Urbanek |
| 2014/0113610 A1 | 4/2014 | Ramprasad et al. |
| 2014/0206313 A1 | 7/2014 | Spanel et al. |
| 2014/0228012 A1 | 8/2014 | Annan et al. |
| 2014/0228042 A1 | 8/2014 | Annan et al. |
| 2014/0274032 A1 | 9/2014 | Shipley et al. |
| 2014/0373184 A1 | 12/2014 | Mahaffey Kevin Patrick et al. |
| 2015/0065105 A1 | 3/2015 | Masterson Michelle E. et al. |
| 2015/0111564 A1 | 4/2015 | Urbanek |
| 2015/0111565 A1 | 4/2015 | Urbanek |

FOREIGN PATENT DOCUMENTS

| | | |
|---|---|---|
| WO | 2014046814 A1 | 3/2014 |
| WO | 2014113128 A1 | 7/2014 |
| WO | 2014123758 A1 | 8/2014 |
| WO | 2014123759 A1 | 8/2014 |
| WO | 2014158430 A1 | 10/2014 |
| WO | WO2015030945 A1 | 3/2015 |
| WO | WO2015060965 A2 | 4/2015 |

OTHER PUBLICATIONS

Notice of Allowance dated Nov. 2, 2012, U.S. Appl. No. 13/556,202, filed Jul. 24, 2012.

(56) References Cited

OTHER PUBLICATIONS

Notice of Allowance dated Jun. 11, 2013, U.S. Appl. No. 13/752,386, filed Jan. 28, 2013.
First Action Interview Pre-Interview Communication dated Feb. 25, 2013, U.S. Appl. No. 13/149,505, filed May 31, 2013.
First Action Interview Office Action dated May 8, 2013, U.S. Appl. No. 13/149,505, filed May 31, 2013.
Notice of Allowance dated Aug. 9, 2013, U.S. Appl. No. 13/149,505, filed May 31, 2013.
First Action Interview Pre-Interview Communication dated Sep. 22, 2014, U.S. Appl. No. 13/468,028, filed May 9, 2013.
First Action Interview Pre-Interview Communication dated Aug. 13, 2013, U.S. Appl. No. 13/335,941, filed Dec. 23, 2011.
Notice of Allowance dated Oct. 9, 2013, U.S. Appl. No. 13/335,941, filed Dec. 23, 2011.
First Action Interview Pre-Interview Communication dated Apr. 23, 2014, U.S. Appl. No. 13/622,234, filed Sep. 18, 2012.
Final Office Action dated Sep. 19, 2014, U.S. Appl. No. 13/622,234, filed Sep. 18, 2012.
Advisory Action dated Dec. 17, 2014, U.S. Appl. No. 13/622,234, filed Sep. 18, 2012.
FAIPP Pre-Interview Communication dated Mar. 19, 2014, U.S. Appl. No. 13/744,847, filed Jan. 18, 2013.
Notice of Allowance dated Aug. 4, 2014, U.S. Appl. No. 13/744,847, filed Jan. 18, 2013.
FAIPP Pre-Interview Communication dated Jul. 16, 2014, U.S. Appl. No. 13/744,861, filed Jan. 18, 2013.
Notice of Allowance dated Nov. 22, 2014, U.S. Appl. No. 13/744,861, filed Jan. 18, 2013.
First Action Interview Pre-Interview Communication dated Oct. 22, 2014, U.S. Appl. No. 13/763,428, filed Feb. 8, 2013.
First Action Interview Pre-Interview Communication dated Apr. 3, 2014, U.S. Appl. No. 13/763,434, filed Feb. 8, 2013.
Final Office Action dated Aug. 19, 2014, U.S. Appl. No. 13/763,434, filed Feb. 8, 2013.
Office Action dated Aug. 7, 2014, U.S. Appl. No. 13/831,504, filed Mar. 14, 2013.
Notice of Allowance dated Dec. 29, 2014, U.S. Appl. No. 13/831,504, filed Mar. 14, 2013.
First Action Interview Pre-Interview Communication dated Nov. 20, 2014, filed May 21, 2013.
Foreign Communication from a Related Counterpart—International Search Report and Written Opinion, dated Feb. 29, 2012, PCT/US2011/063736, filed on Dec. 7, 2011.
Foreign Communication from a Related Counterpart Application, "Preliminary Report on Patentability", dated Jun. 20, 2013, PCT/US2011/063736 filed on Dec. 7, 2011.
Foreign Communication from a Related Counterpart—International Search Report and Written Opinion, dated Jul. 24, 2013, PCT/US13/40278, filed on May 9, 2013.
Foreign Communication from a Related Counterpart—International Search Report and Written Opinion, dated Nov. 14, 2013, PCT/US13/55023, filed on Aug. 15, 2013.
Foreign Communication From a Related Counterpart Application, International Search Report and Written Opinion dated Jan. 24, 2014, PCT/US13/68981 filed on Nov. 7, 2013.
Foreign Communication from a Related Counterpart—International Search Report and Written Opinion, dated May 19, 2014, PCT/US14/13936, filed on Jan. 30, 2014.
Foreign Communication from a Related Counterpart—International Search Report and Written Opinion, dated May 14, 2014, PCT/US14/13939, filed on Jan. 30, 2014.
Foreign Communication from a Related Counterpart—International Search Report and Written Opinion, dated Jun. 3, 2014, PCT/US14/16650, filed on Feb. 16, 2014.
Foreign Communication from a Related Counterpart Application, "Preliminary Report on Patentability," dated Nov. 20, 2014, PCT/US13/40278 filed on May 9, 2013.
Foreign Communication from a Related Counterpart—International Search Report and Written Opinion, dated Dec. 17, 2014, PCT/US14/46773, filed on Jul. 16, 2014.
Foreign Communication from a Related Counterpart—International Search Report and Written Opinion, dated Dec. 30, 2014, PCT/US14/56778, filed Sep. 22, 2014.
Delker, Jason R., "Loading Branded Media Outside System Partition", filed Oct. 30, 2013 U.S. Appl. No. 14/066,947.
Mauer, Brian D., et al., "Automatic Branding of Generic Applications", filed Jan. 10, 2013, U.S. Appl. No. 14/152,627.
Annan, Brandon C., et al., "System and Method of Branding and Labeling a Mobile Device", filed Mar. 15, 2013, U.S. Appl. No. 13/844,104.
Annan, Brandon C., et al., "Electronic Fixed Brand Labeling", filed Feb. 8, 2013, U.S. Appl. No. 13/763,443.
Ghoshal, Jagannath, et al., "Rebranding a Portable Electronic Device While Maintaining User Data", filed May 22, 2013, U.S. Appl. No. 13/899,567.
Ghoshal, Jagannath, et al., "System and Method for Retrofitting a Branding Framework into a Mobile Communication Device", filed May 21, 2013, U.S. Appl. No. 13/899,566.
Urbanek, Robert E., "Delivery of Branding Content and Customizations to a Mobile Communication Device", filed Oct. 23, 2013, U.S. Appl. No. 14/060,712.
Urbanek, Robert E., "Delivery of Branding Content and Customizations to a Mobile Communication Device", filed Sep. 22, 2014, International U.S. Appl. No. PCT/US14/56778.
Urbanek, Robert E., "Implementation of Remotely Hosted Branding Content and Customizations", filed Oct. 23, 2013, U.S. Appl. No. 14/085,474.
Urbanek, Robert E., "Subscriber Identity Module Virtualization", filed Nov. 20, 2013, U.S. Appl. No. 14/060,719.
Indurkar, Dhananjay, "System and Method of Branding a Device Independent of Device Activation", filed Jan. 24, 2014, U.S. Appl. No. 14/163,035.
Sumner, Bret D., "Directing Server Connection Based on Location Identifier", filed Aug. 15, 2013, U.S. Appl. No. 13/968,259.
Abou-El-Ella, Hassan, et al., "Segmented Customization Payload Delivery", filed Aug. 27, 2013, U.S. Appl. No. 14/010,518.
Sumner, Bret D., "Segmented Customization Package Within Distributed Server Architecture", filed Aug. 27, 2013, U.S. Appl. No. 14/010,522.
Masterson, Michelle E., et al., "Development and Testing of Payload Receipt by a Portable Electronic Device", filed Aug. 27, 2013, U.S. Appl. No. 14/010,523.
Masterson, Michelle E., et al., "System and Methods for Deferred and Remote Device Branding", filed Aug. 27, 2013, U.S. Appl. No. 14/010,524.
Masterson, Michelle E., et al., "System and Methods for Deferred and Remote Device Branding", filed Jul. 16, 2014, International Serial No. PCT/US14/46773.
Callan, Jeffery S., et al., "Delivery of Oversized Branding Elements for Customization", filed Nov. 6, 2013, U.S. Appl. No. 14/073,321.
Indurkar, Dhananjay, "Background Delivery of Device Configuration and Branding", filed Jan. 16, 2014, U.S. Appl. No. 14/157,507.
Ahn, Chul Jin, et al., "Separation of Client Identification Composition from Customization Payload to Original Equipment Manufacturer Layer", filed Nov. 8, 2013, U.S. Appl. No. 14/075,687.
Ghoshal, Jagannath, et al., "Multiple Carrier Partition Dynamic Access on a Mobile Device", filed Jun. 5, 2014, U.S. Appl. No. 14/297, 429.
Indurkar, Dhananjay, "Activation Sequence Using Permission Based Connection to Network", filed Jan. 24, 2014, U.S. Appl. No. 14/163,041.
Ahn, Chul Jin, et al., "Customization for Preloaded Applications", filed Mar. 31, 2014, U.S. Appl. No. 14/231,718.
Koller, Gary D., et al., "Out of the Box Experience (OOBE) Country Choice Using Wi-Fi Layer Transmission," filed Oct. 31, 2014, U.S. Appl. No. 14/530,666.
Blinn, Benjamin P., et al. "System and Method of Efficient Mobile Device Network Brand Customization," filed Sep. 2, 2014, U.S. Appl. No. 14/475,399.

(56) References Cited

OTHER PUBLICATIONS

First Action Interview Office Action dated Mar. 16, 2015, U.S. Appl. No. 13/468,028, filed May 9, 2013.
Office Action dated Mar. 2, 2015, U.S. Appl. No. 13/622,234, filed Sep. 18, 2012.
FAIPP Pre-Interview Communication dated Apr. 8, 2015, U.S. Appl. No. 13/844,104, filed Mar. 15, 2013.
Notice of Allowance dated Mar. 20, 2015, U.S. Appl. No. 13/763,428, filed Feb. 8, 2013.
Notice of Allowance dated Mar. 26, 2015, U.S. Appl. No. 13/763,434, filed Feb. 8, 2013.
FAIPP Pre-Interview Communication dated Mar. 12, 2015, U.S. Appl. No. 13/972,827, filed Aug. 21, 2013.
Notice of Allowance dated Jan. 22, 2015, U.S. Appl. No. 13/899,566, filed May 21, 2013.
FAIPP Pre-Interview Communication dated Apr. 15, 2015, U.S. Appl. No. 14/060,712, filed Nov. 20, 2013.
FAIPP Pre-Interview Communication dated Mar. 4, 2015, U.S. Appl. No. 14/010,518, filed Aug. 27, 2013.
FAIPP Pre-Interview Communication dated Apr. 1, 2015, U.S. Appl. No. 14/010,522, filed Aug. 27, 2013.
FAIPP Pre-Interview Communication dated Apr. 3, 2015, U.S. Appl. No. 14/010,523, filed Aug. 27, 2013.
FAIPP Pre-Interview Communication dated Mar. 10, 2015, U.S. Appl. No. 14/010,524, filed Aug. 27, 2013.
FAIPP Pre-Interview Communication dated Apr. 8, 2015, U.S. Appl. No. 14/157,507, filed Jan. 16, 2014.
Foreign Communication from a Related Counterpart—International Preliminary Report on Patentability, dated Apr. 2, 2015, PCT/US13/55023, filed on Aug. 15, 2013.
Ghoshal, Jagannath, et al., "Multi-Step Mobile Device Initiation with Intermediate Partial Reset," filed Aug. 21, 2013, U.S. Appl. No. 13/972,827.
Delker, Jason R., et al. "Subscriber Identity Module (SIM) Card Initiation of Custom Application Launcher Installation on a Mobile Communication Device," filed Mar. 4, 2015, U.S. Appl. No. 14/639,056.
Delker, Jason R., et al. "Network Access Tiered Based on Application Launcher Installation," filed Mar. 4, 2015, U.S. Appl. No. 14/639,060.
FAIPP Pre-Interview Communication dated Jun. 2, 2015, U.S. Appl. No. 14/152,627, filed Jan. 10, 2013.
FAIPP Pre-Interview Communication dated Apr. 23, 2014, U.S. Appl. No. 13/763,443, filed Feb. 8, 2013.
First Action Interview Office Action dated Jun. 16, 2014, U.S. Appl. No. 13/763,443, filed Feb. 8, 2013.
Office Action dated Jun. 16, 2015, U.S. Appl. No. 13/899,567, filed May 22, 2013.
Notice of Allowance dated May 7, 2015, U.S. Appl. No. 13/972,827, filed on Aug. 21, 2013.
Notice of Allowance dated May 29, 2015, U.S. Appl. No. 14/085,474, filed on Nov. 20, 2013.
Notice of Allowance dated May 8, 2015, U.S. Appl. No. 14/010,518, filed on Aug. 27, 2013.
Notice of Allowance dated Jul. 8, 2015, U.S. Appl. No. 14/010,522, filed on Aug. 27, 2013.
Notice of Allowance dated Jun. 26, 2015, U.S. Appl. No. 14/010,523, filed on Aug. 27, 2013.
Notice of Allowance dated Apr. 28, 2015, U.S. Appl. No. 14/010,524, filed on Aug. 27, 2013.
Restriction Requirement dated May 21, 2015, U.S. Appl. No. 14/073,321, filed Nov. 6, 2013.
FAIPP Pre-Interview Communication dated Jul. 8, 2015, U.S. Appl. No. 14/475,399, filed Sep. 2, 2014.
Amazon Kindle e-book reader, on public sale 2007, http://en.wikipedia.org/wiki/Amazon_Kindle. last accessed on Apr. 13, 2015.

DYNAMIC REMOTELY MANAGED SIM PROFILE

CROSS-REFERENCE TO RELATED APPLICATIONS

This application is a continuation of and claims priority under 35 U.S.C. §120 to U.S. patent application Ser. No. 13/744,847, filed on Jan. 18, 2013, entitled "Dynamic Remotely Managed SIM Profile," by Robert L. Spanel, et al., which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones, personal digital assistants, and similar portable electronic devices that have telecommunications capabilities may include at least one memory module, such as but not limited to a Universal Integrated Circuit Card (UICC), a Subscriber Identity Module (SIM), a Universal Subscriber Identity Module (USIM), or a Removable User Identity Module (R-UIM). Any such module may be referred to herein as a memory module. Identifying information associated with the mobile device, identifying information associated with the user of the mobile device, user account information, and other device-related and/or user-related information may be stored in the memory module. Some memory modules may be removable cards, and other memory modules may be embedded in the circuitry of the mobile device.

Mobile devices that communicate according to the global system for mobile communications (GSM) wireless communication protocol or according to the long-term evolution (LTE) wireless communication protocol typically use SIM cards. Devices that communicate according to the code division multiple access (CDMA) wireless communication protocol or according to the worldwide interoperability for microwave access (WiMAX) wireless communication protocol typically do not use SIM cards.

SUMMARY

In an embodiment, a method for managing device profiles is disclosed. The method comprises adding at least one alternative primary profile to a memory module at an alternative address different from a main address of a main primary profile. The method further comprises modifying a pointer that points to an address in the memory module from which a profile is retrieved such that the pointer points to the alternative address. The main primary profile comprises a main device identifier and a main authentication key, and the alternative primary profile comprises an alternative device identifier and an alternative authentication key.

In another embodiment, a system for creating and installing an alternative primary profile on a device is provided. The system comprises a first version of a profile management tool and a second version of the profile management tool. The first version of the profile management tool is configured to receive identity information associated with the device and test environment information associated with the device and further configured to create the alternative primary profile based on the identity information and the test environment information. The second version of the profile management tool is configured to receive the alternative primary profile from the first version of the profile management tool and further configured to install the alternative primary profile on the device. The alternative primary profile comprises an alternative device identifier based on the identity information and an alternative authentication key.

In another embodiment, a method for creating and installing an alternative primary profile on a device is disclosed. The method comprises retrieving, by a profile management tool, from a repository of test environment templates, a test environment template applicable to testing to be performed on the device. The method further comprises combining, by the profile management tool, the test environment template with identity information for the device to create the alternative primary profile. The method further comprises installing, by the profile management tool, at an alternative memory address on the device different from a main memory address of a main primary profile for the device, the alternative primary profile.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
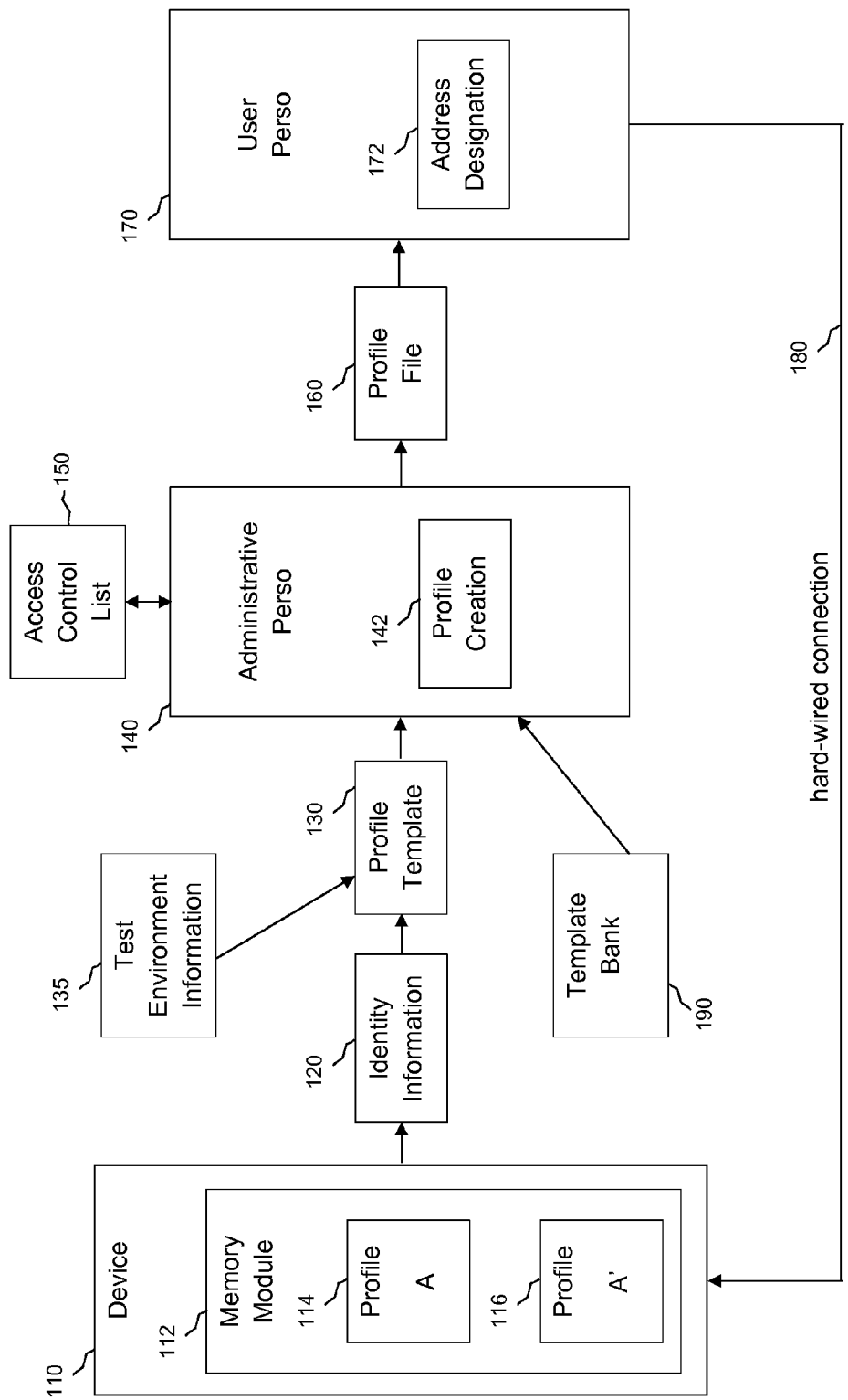
FIG. 1 is an illustration of a system for creating and installing an alternative primary profile on a device according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure describes a system for and methods of providing an alternative primary profile on a telecommunication device. In an embodiment, quality assurance parameters associated with a desired test environment are combined with identity information for a specific device to create an alternative primary profile. The alternative primary profile is loaded into a memory location in a memory module different from the memory location of the main primary profile. The memory address from which profile information is read from the memory module can be switched between the address of the main primary profile and the address of the alternative primary profile. During standard consumer operation of the device, profile information can be read from the memory location of the main primary profile in the standard manner. During testing of the device, profile information can be read from the memory location of the alternative primary profile. In this way, testing can be performed on the device without any manipulation of or impact to the main primary profile. If testing is to be performed on the same device with different quality assurance parameters, the new parameters can overwrite the previous parameters in the memory location of the alternative primary profile. While the embodiments disclosed herein may be discussed in the context of the testing of mobile devices, the embodiments may be applicable in other scenarios as well.

A device profile is typically stored in the device's memory module at the time of manufacture of the device. The profile typically contains, among other information, a device identifier and an authentication key. In the case of LTE or GSM, the device identifier might be an International Mobile Subscriber Identity (IMSI), and the authentication key might be referred to as the K value. In the case of CDMA, the device identifier might be a Mobile Directory Number (MDN), and the authentication key might be referred to as the A-key. A profile might also contain information about how the device operates in a particular environment, such as the servers that the device might be connected to. In an embodiment, a main primary profile may comprise a main device identifier and a main authentication key, and an alternative primary profile may comprise an alternative device identifier and an alternative authentication key.

Typically, only the manufacturer of the memory module has access to certain profile parameters that are stored on the memory module, such as the identifier and the authentication key. Once such parameters have been stored in the memory module, they can typically be changed only by the manufacturer. That is, if the identifier or the authentication key is to be changed, the device may have to be returned to the manufacturer where it may be connected via a hard-wired connection to the appropriate equipment for making such a modification.

Some devices may include both a primary profile and a secondary profile. Each profile may be associated with a different telecommunications provider, or the different profiles may exist for some other reason. The profiles might be prioritized such that the primary profile is used under typical circumstances and the secondary profile is used under less common circumstances. In some cases, the primary profile and the secondary profile are located in the same memory module, and in other cases, the primary profile and the secondary profile are located in different memory modules. At least one of the profiles might be loaded onto a removable memory module. If a device user wishes to change profiles, the user might replace a removable memory module that contains a first profile with another removable memory module that contains a second profile.

As an example, a device might have a primary profile on either an embedded or removable memory module and a secondary profile on a removable memory module. The user of the device might use the primary profile for domestic calling and use the secondary profile for international calling. If the user travels to multiple countries, upon leaving one country and entering another, the user may swap the removable memory module with a different memory module that has a different secondary profile so that the device maintains a secondary profile appropriate for the country in which it is present. The primary profile would be retained throughout the swapping of the secondary profiles and would be available to the user upon returning from the international travel.

As mentioned above, at or near the time of manufacture of a device, at least one profile may be loaded into at least one of the device's memory modules. At some point in the manufacturing process after the profile has been loaded, testing may be performed on the device to ensure that the device functions properly in the environment in which it is expected to operate. Different locations where testing occurs may have different environments and different quality assurance parameters, and different profiles may be loaded into a memory module at each location to account for these different test parameters. Thus, testing a device under different environmental parameters may be likened to operating the device in different networks. Since the memory module manufacturer has control over the information that is loaded into the secure locations on a memory module, the manufacturer can change the test parameters as needed. No other entity has access to the secure locations where the profiles are stored, so no other entity can modify the test parameters through direct manipulation of values stored in the memory module.

In some situations, testing may need to be done after a device has left the point of manufacture, and the testing may require a profile different from the profile that was loaded onto the device at the time of manufacture. If the testing is to be performed for a profile stored on an embedded memory module, the device may have to be returned to the manufacturer so that the manufacturer can load the different profile into the embedded memory module. If the testing is to be performed for a profile stored on a removable memory module, it may be possible to remove the memory module currently installed in the device and install a different memory module that has the profile for which testing is to be performed. That is, a memory module manufacturer may produce multiple memory modules, each having a different profile, and the manufacturer may make these memory modules available to another entity that may wish to do testing. The other entity may maintain a repository of such modules and may swap the modules out as needed to perform testing for different profiles associated with different testing environments.

With either embedded memory modules or removable memory modules, considerable inconvenience may be experienced when testing is to be performed for a profile different from the profile originally loaded onto a device. For embedded memory modules, it can be inconvenient to return the device to the manufacturer. For removable memory modules, it can be inconvenient to maintain a large number of modules and swap the modules for every different quality assurance environment to be tested.

Embodiments of the present disclosure can overcome these inconveniences by providing an alternative primary profile that can be loaded into a memory location on a memory module different from the memory location in which the main primary profile is loaded. The alternative primary profile can be associated with parameters that allow a device to be tested under a specified quality assurance environment. If a different set of parameters is wanted, the new set can overwrite the previous set in the same alternative memory location of the memory module. Alternatively, a memory module may include multiple alternative memory locations, and a different alternative primary profile could be loaded into each of the locations.

The use of the alternative primary profile allows a primary profile to be loaded onto a device without affecting the main primary profile that was loaded onto the device at the time of manufacture. The primary profile that is in use at a given time can be switched between the main primary profile and the alternative primary profile such that, when the device is to be used in a standard manner, the main primary profile can be selected, and when testing is to be performed, the alternative primary profile can be selected. Thus, a profile with a desired set of quality assurance parameters can be loaded into the alternative primary profile, and testing can be performed for that profile without returning the device to the manufacturer and without swapping removable memory modules.

More specifically, the main primary profile can be stored in a memory module at a first memory location, and the alternative primary profile can be stored in a memory module at a second memory location. When a device is to be operated in the standard manner, an address pointer can be set such that the device retrieves a profile from the first memory location. When testing is to be performed on the device, the address pointer can be set such that the device retrieves a profile from the second memory location. This addressing technique may be referred to as indirect addressing in some contexts.

It should be understood that the alternative primary profile is different from the secondary profiles discussed above. A primary profile and a secondary profile may be active at the same time, with one perhaps having priority over the other at a given time. The primary and secondary profiles may allow a user of a device to easily switch back and forth between different usage scenarios. A main primary profile and an alternative primary profile, on the other hand, cannot be active at the same time. When active, each type of primary profile has priority over any secondary profiles that may be available. Switching between the main primary profile and the alternative primary profile typically requires changing the memory module address from which profile information is read.

In an embodiment, a profile management tool that can be referred to as the Perso tool can be used to create and install an alternative primary profile on a device at a time after the time of manufacture and/or at a location other than the point of manufacture. The creation and installation of the alternative primary profile can be performed by an entity other than the manufacturer of the memory module in the device. For example, a telecommunications provider or other vendor of the device may wish to create and install an alternative primary profile in order to perform testing on the device.

In a typical scenario, a testing technician associated with the entity that wishes to perform testing might retrieve identity data, such as an identifier and an authentication key, from the device to be tested. The tester might then place the identity data in a profile template that has been designed to receive such data. The tester might then send the template to an authorized person who is also associated with the entity performing the testing. The authorized person might then place the identity data from the template and information about a desired test environment into an administrative version of the Perso tool. Alternatively, the tester may place the test environment information in the template. An access control list or similar security mechanism might be used to ensure that only authorized persons are allowed to use the administrative version of the Perso tool.

The administrative version of the Perso tool uses the identity data and the information about the desired test environment to generate a profile file. The profile file can then be made available to the tester, who has access to a user version of the Perso tool. Using a hard-wired connection between the user version of the Perso tool and the device, the tester might install the profile file in the memory module of the device at a secure location that is available to the entity performing the testing but that cannot be accessed by any other entity. The address of the secure location is different from the address of the main primary profile and becomes the address of the alternative primary profile. The user version of the Perso tool may provide a capability for the tester to switch the address from which a profile is retrieved during testing from the address of the main primary profile to the address of the alternative primary profile.

In an embodiment, the data used in creating the alternative primary profile is wholly under the control of the entity performing the testing. That is, no entity other than the entity performing the testing has access to the data used in creating the alternative primary profile, and the entity performing the testing does not use data from any other source.

In addition, the entity performing the testing is not allowed any access to the secure data associated with the main primary profile. In this way, the existing security levels for the main primary profile are maintained, and the main primary profile is not impacted in any way by the testing that is performed on the alternative primary profile.

In an embodiment, a secure bank of profile templates or potential alternative primary profiles that can automatically be converted into actual alternative primary profiles may be maintained by an entity performing device testing. The profiles in the bank may merely need to have device identity information inserted in order to be converted into actual alternative primary profiles. In this way, the profile files could be generated automatically without the need for an authorized person to manually place profile templates in the Perso tool.

FIG. 1 illustrates an embodiment of a system that might be used in creating and installing an alternative primary profile on a device. A device 110 includes a memory module 112 that might be an embedded or removable card such as a SIM or a UICC. The memory module 112 includes a main primary profile 114 that has been installed in the memory module 112 in the standard manner by the manufacturer of the memory module 112 at the time of manufacture. The main primary profile 114 is referred to in FIG. 1 as Profile A 114.

The device 110 may be a mobile phone, a personal digital assistant (PDA), a media player, or another mobile communication device. The device 110 may be a laptop computer, a notebook computer, a tablet computer, or another portable computer. The device 110 may be a desktop computer or a computer-like module embedded in a machine or other system such as a printer, a refrigerator, or other device.

If testing is to be performed on the device 110 after the time of manufacture and/or at a location other than the point of manufacture, a testing technician might obtain identity information 120 from the device 110. The identity information 120 might include an identifier and an authentication key. The testing technician might then place the identity information 120 in a profile template 130 that has been designed to receive the identity information 120. The testing technician might then send the completed template 130 via some means of communication to an authorized person who has access to an administrative version 140 of the Perso tool. In some embodiments, the testing technician might include in the profile template 130 information 135 about an environment in which testing is to be performed. Alternatively, the authorized person might provide the test environment information 135 directly into the administrative version 140 of the Perso tool. The authorized person's access to the administrative version 140 of the Perso tool might be controlled by an access control list 150 or a similar security mechanism.

The administrative version 140 of the Perso tool has the capability to create alternative primary profiles based on the identity information 120 in the profile template 130 and on the test environment information 135. A profile creation component 142 in the administrative version 140 of the Perso tool may generate an alternative primary profile using this identity and environment information and place the alternative primary profile in a profile file 160. The profile file 160 might then be sent via some means of communication to a user version 170 of the Perso tool. While the administrative version 140 and the user version 170 of the Perso tool are depicted as separate components, the administrative version 140 and the user version 170 could be different versions of the same entity, could be different entities, or could be different components within an overall Perso system. Typically, the administrative version 140 of the Perso tool would have a higher level of security than the user version 170 of the Perso tool.

After the user version 170 of the Perso tool receives the profile file 160, the testing technician might use the user version 170 of the Perso tool to install on the device 110 the alternative primary profile that was contained in the profile file 160. The installed alternative primary profile is referred to in FIG. 1 as Profile A' 116. The alternative primary profile 116 has a different address in the memory module 112 than the main primary profile 114.

In an embodiment, the user version 170 of the Perso tool includes an address designation component 172 that allows the testing technician to specify the address in the memory module 112 at which the alternative primary profile 116 is to be installed. The address designation component 172 might also allow the testing technician to specify the address from which profile information is to be read. That is, the address designation component 172 might set an address pointer in the device 110 such that either the main primary profile 114 or the alternative primary profile 116 is read by applications that execute on the device 110 and attempt to access a primary profile.

In an embodiment, the connection over which the alternative primary profile 116 is installed is a hard-wired connection 180, such as a Universal Serial Bus (USB) connection. The hard-wired connection 180 can improve security compared to a wireless connection since the use of the hard-wired connection 180 ensures that a testing technician must be physically present to make the connection between the device 110 and the user version 170 of the Perso tool. The credentials of the testing technician can be verified to ensure that only authorized persons are allowed to make the physical connection between the user version 170 of the Perso tool and the device 110 and thereby install the alternative primary profile 116 on the device 110.

In an embodiment, at least a portion of the procedure for creating profile files 160 that contain alternative primary profiles 116 can be automated. That is, a repository 190 of profile templates or potential alternative primary profiles might be maintained and might be capable of communicating with the administrative version 140 of the Perso tool over a communication link. A plurality of profile templates might be maintained in the repository 190, and each of the profile templates might include information associated with a different test environment. The administrative version 140 of the Perso tool can convert a profile template received from the repository 190 to a profile file 160 by combining identity information for a specific device with test environment information contained in a stored template. In this way, the authorized person need only associate the appropriate test environment information with a potential alternative primary profile and then provide the associated information to the administrative version 140 of the Perso tool.

When testing is to be performed on the device 110, the testing technician might use the user version 170 of the Perso tool to specify that profile information is to be read from the address of the alternative primary profile 116. When testing is complete, the testing technician might use the user version 170 of the Perso tool to specify that profile information is to be read from the address of the main primary profile 114. In some embodiments, the alternative primary profile 116 might then be erased from the memory module 112. The erasure might be initiated by a request from the testing technician or might be done automatically upon completion of the testing. That is, when testing of the device 110 is complete, the alternative primary profile 116 may be deleted by an automatic deletion or a requested deletion.

Figure 2:
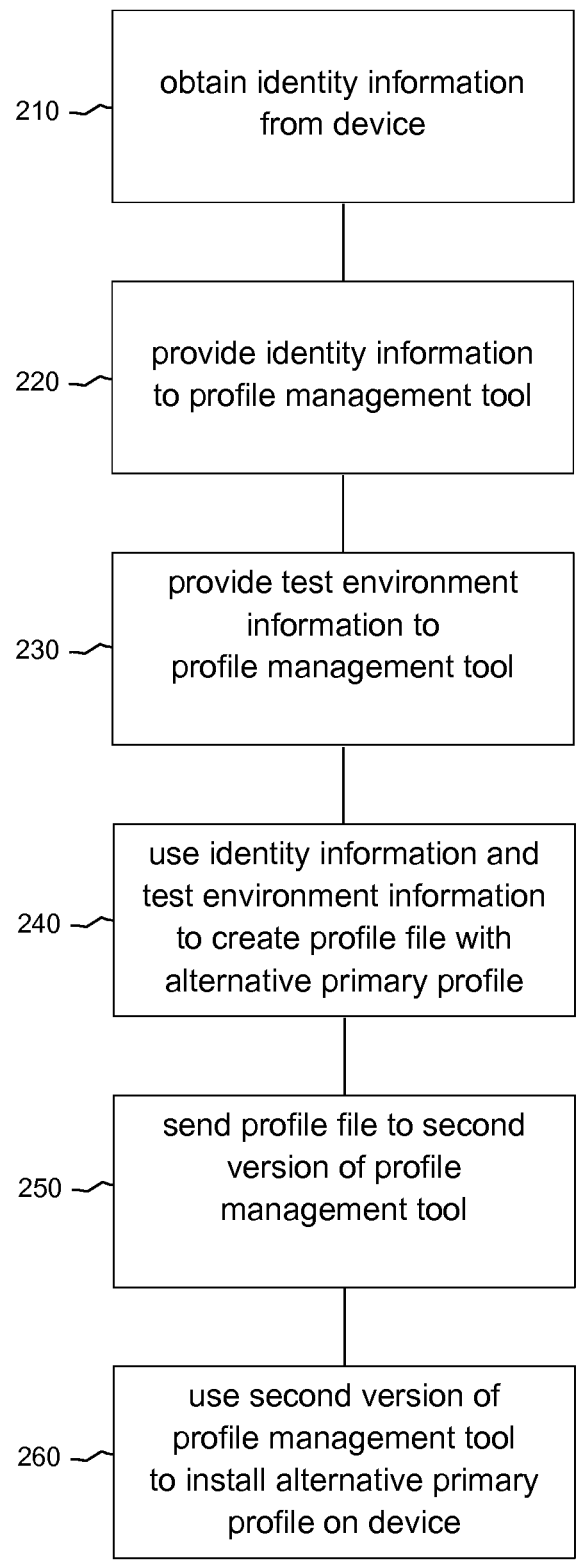
FIG. 2 is a flow chart of a method for creating and installing an alternative primary profile on a device according to an embodiment of the disclosure.

FIG. 2 is a flow chart illustrating an embodiment of a method for creating and installing alternative primary profiles on a device. At block 210, identity information is obtained from the device. At block 220, the identity information is provided to a profile management tool. The identity information may be entered into a profile template designed to receive the identity information, and then the completed template may be provided to the profile management tool. At block 230, test environment information is provided to the profile management tool. In some embodiments, the test environment information may be entered into the profile template by a testing technician. In other embodiments, the test environment information may be entered directly into the profile management tool by an authorized person who is allowed access to the identity management tool and who may specify the parameters under which testing of the device is to occur. In other embodiments, the test environment information may be obtained from a repository of potential alternative primary profiles, each associated with a different test environment.

At block 240, the profile management tool uses the identity information and the test environment information to create a profile file that contains an alternative primary profile. At block 250, the profile management tool sends the profile file to a second version of the profile management tool. The profile management tool and the second version of the profile management tool may be similar components that have differences in their capabilities and/or their authority levels or may be differently enabled components within an overall profile management system.

At block 260, the second version of the profile management tool is used to install the alternative primary profile on the device. A testing technician may be able to use the second version of the profile management tool to specify an address in a memory module in the device at which the alternative primary profile is to be installed and from which the alternative primary profile is to be read. The installation of the alternative primary profile may occur over a hard-wired connection between the second version of the profile management tool and the device. After the installation of the alternative primary profile, testing may be performed on the device using the alternative primary profile and the parameters specified in the test environment information. When testing is complete, the second version of the profile management tool may be used to switch the memory address from which profile information is read to the address of the main primary profile, thus allowing the device to operate in the standard manner for consumer use. The alternative primary profile might then be erased, either manually or automatically. Alternatively, steps may be taken to ensure that the pointer that points to the location from which profiles are read does not point to the location of the alternative primary profile.

Figure 3:
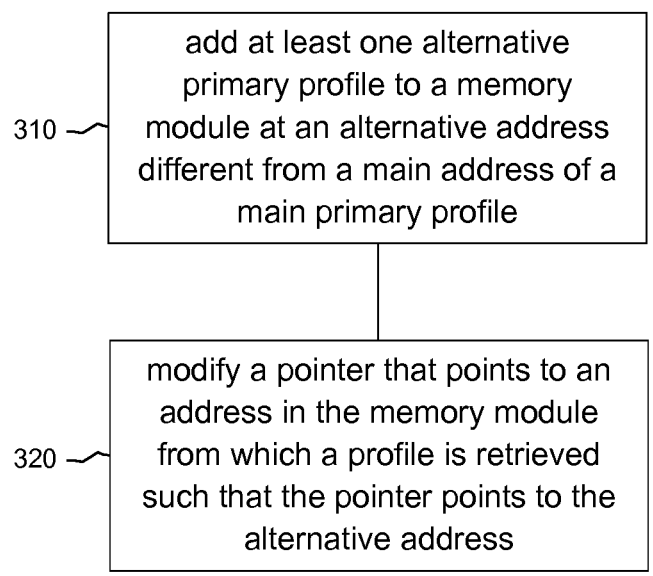
FIG. 3 is a flow chart of a method for managing device profiles according to an embodiment of the disclosure.

FIG. 3 is a flow chart illustrating an embodiment of a method for managing telecommunication device profiles. At block 310, at least one alternative primary profile is added to a memory module at an alternative address different from a main address of a main primary profile. At block 320, a pointer that points to an address in the memory module from which a profile is retrieved is modified such that the pointer points to the alternative address.

Figure 4:
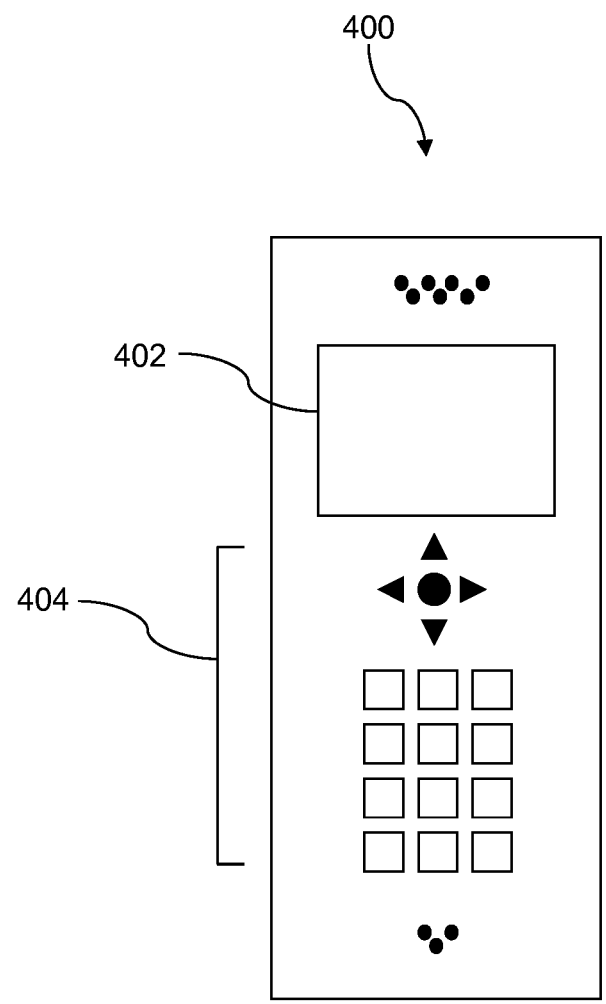
FIG. 4 is an illustration of a handset according to an embodiment of the disclosure.

FIG. 4 depicts a mobile device 400, which is operable for implementing aspects of the present disclosure, but the present disclosure should not be limited to these implementations. The mobile device 400 may be substantially similar to the device 110 of FIG. 1. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
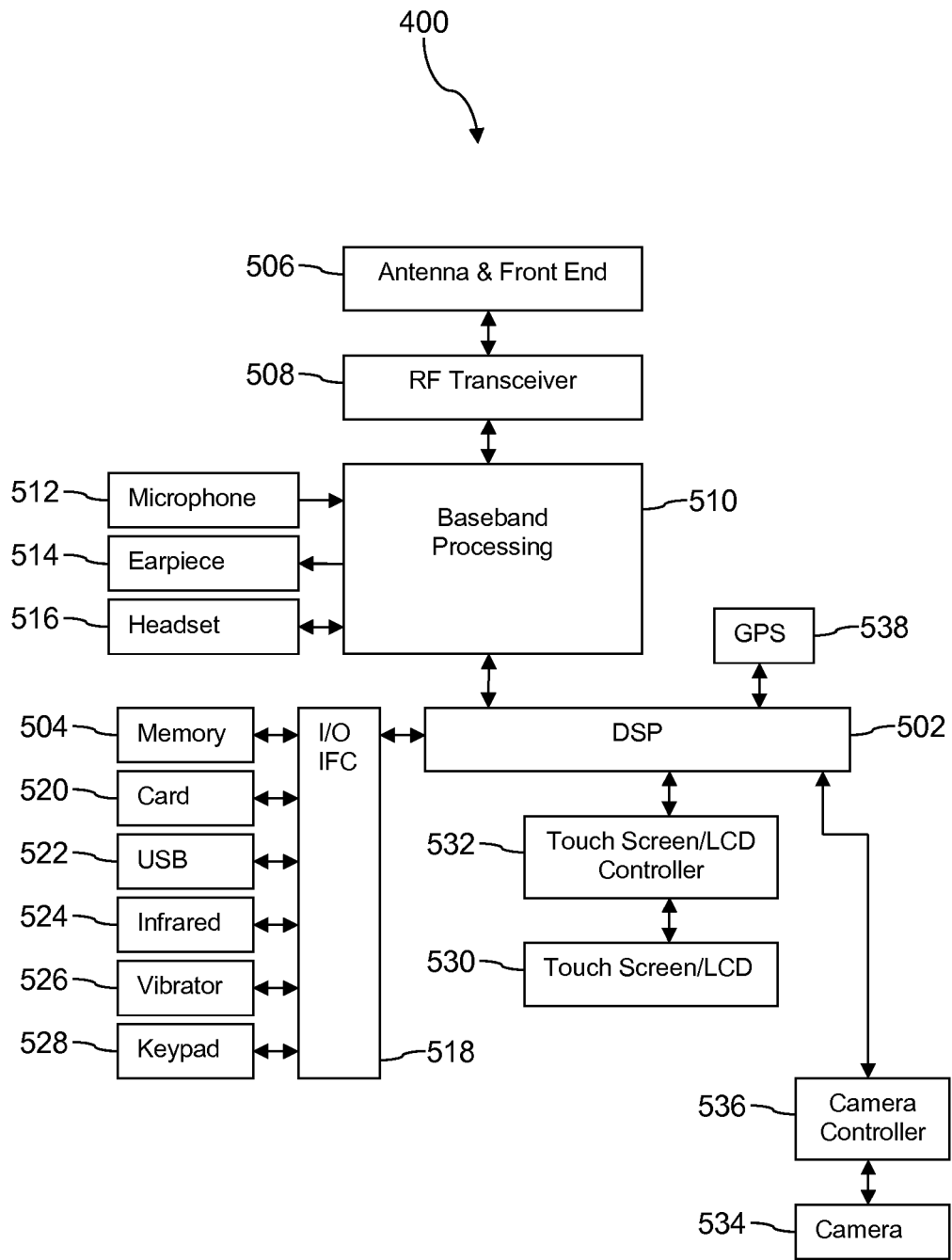
FIG. 5 is a block diagram of a handset according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
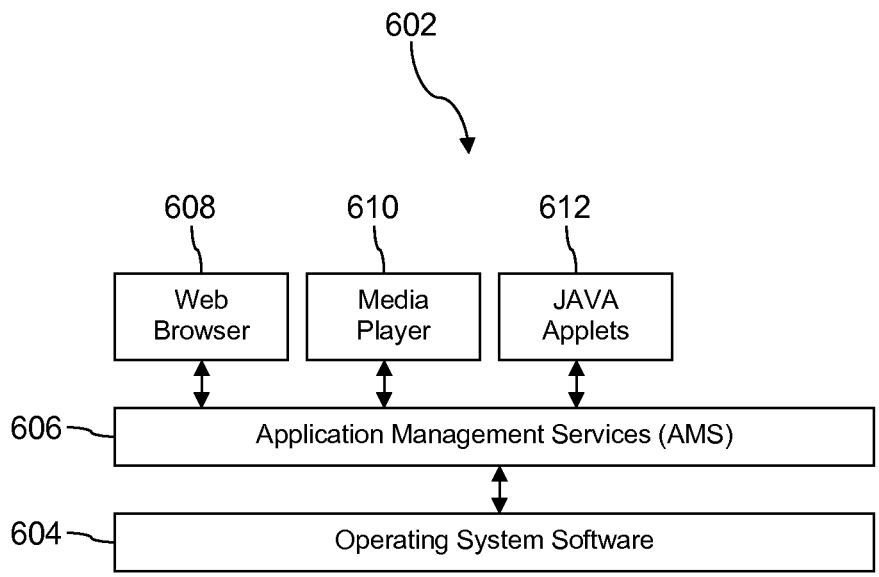
FIG. 6A is a block diagram of a software architecture of a handset according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
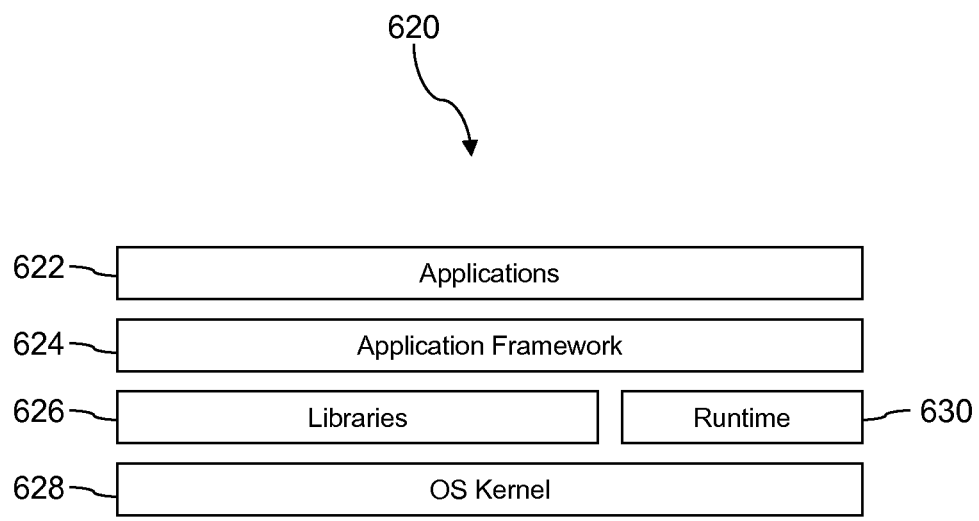
FIG. 6B is a block diagram of another software architecture of a handset according to an embodiment of the disclosure.

FIG. 6B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
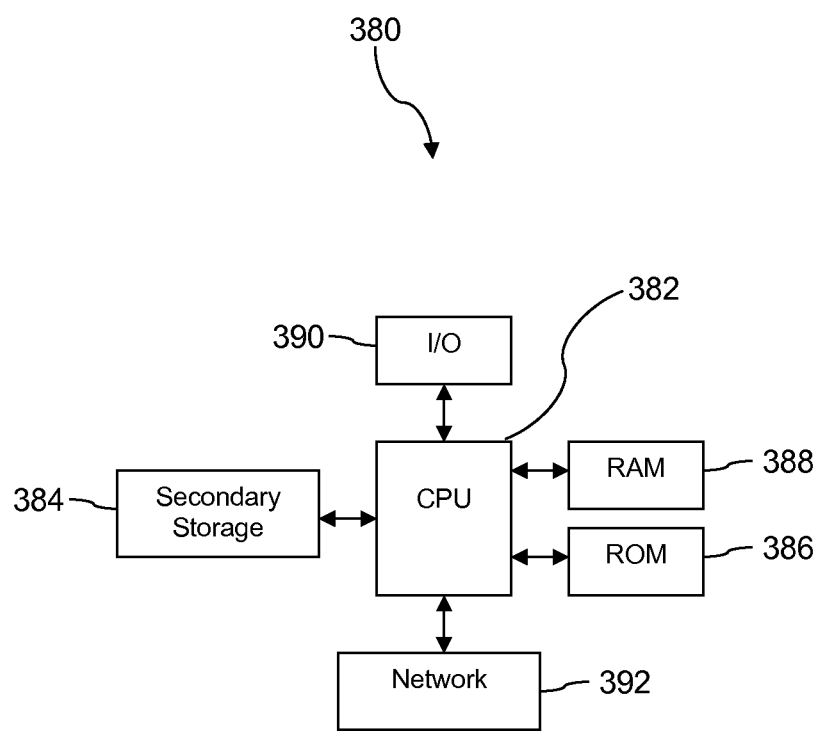
FIG. 7 is an illustration of an exemplary computer system suitable for implementing some aspects of the several embodiments of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for managing device profiles, the method comprising:
    adding at least one alternative primary profile to a memory module at an alternative address different from a main address of a main primary profile, wherein the main primary profile comprises a main device identifier and a main authentication key, and wherein the alternative primary profile comprises an alternative device identifier and an alternative authentication key; and
    modifying a pointer that points to an address in the memory module from which a profile is retrieved such that the pointer points to the alternative address.

2. The method of claim 1, wherein adding the at least one alternative primary profile does not modify the main primary profile.

3. The method of claim 1, wherein the main device identifier of the main primary profile comprises an international mobile subscriber identity (IMSI) or a mobile directory number (MDN), and wherein the main authentication key of the main primary profile comprises a K value or an A-key.

4. The method of claim 1, wherein the alternative primary profile contains information regarding an environment in which the device is to be tested.

5. The method of claim 4, wherein the alternative device identity information and the test environment information are entered into a profile template and the profile template is entered into a profile management tool, and wherein the profile management tool creates the alternative primary profile from the profile template.

6. The method of claim 4, wherein the test environment information is retrieved by a profile management tool from a repository of alternative primary profile templates, and wherein the profile management tool creates the alternative primary profile by combining the test environment information in the alternative primary profile template with the alternative device identity information.

7. The method of claim 4, wherein the alternative primary profile is retrieved from the alternative address for testing of the device and the main primary profile is retrieved from the main address for consumer use of the device.

8. The method of claim 7, wherein, when testing of the device is complete, the alternative primary profile is deleted by at least one of:
    an automatic deletion; or
    a requested deletion.

9. A system for creating and installing an alternative primary profile on a device, the system comprising:
    a first version of a profile management tool configured to receive identity information associated with the device and environment information associated with the device and further configured to create the alternative primary profile based on the identity information and the environment information; and
    a second version of the profile management tool configured to receive the alternative primary profile from the first version of the profile management tool and further configured to install the alternative primary profile on the device, wherein the alternative primary profile comprises an alternative device identifier based on the identity information and an alternative authentication key.

10. The system of claim 9, wherein the alternative primary profile is installed at an alternative memory address different from a main memory address of a main primary profile on the device, wherein the main primary profile comprises a main device identifier and a main authentication key.

11. The system of claim 10, wherein the installation of the alternative primary profile does not modify the main primary profile.

12. The system of claim 10, wherein the second version of the profile management tool directs the device to retrieve the alternative primary profile from the alternative address for testing of the device, and wherein the second version of the profile management tool directs the device to retrieve the main primary profile from the main address for consumer use of the device.

13. The system of claim 12, wherein, when testing of the device is complete, the alternative primary profile is deleted by at least one of:
   an automatic deletion; or
   a requested deletion.

14. The system of claim 9, wherein the environment information comprises test environment information, and wherein the identity information and the test environment information are entered into a profile template and the profile template is entered into the first version of the profile management tool.

15. The system of claim 9, wherein the environment information comprises test environment information, wherein the first version of the profile management tool retrieves the test environment information from a repository of alternative primary profile templates, and wherein the first version of the profile management tool creates the alternative primary profile by combining the test environment information in one of the alternative primary profile templates with the identity information.

16. The system of claim 9, wherein a connection between the device and the second version of the profile management tool is a hard-wired connection.

17. A method for creating and installing an alternative primary profile on a device, the method comprising:
   retrieving, by a profile management tool, from a repository of templates, a template;
   combining, by the profile management tool, the template with identity information for the device to create the alternative primary profile; and
   installing, by the profile management tool, at an alternative memory address on the device different from a main memory address of a main primary profile for the device, the alternative primary profile.

18. The method of claim 17, wherein installing the alternative primary profile does not modify the main primary profile.

19. The method of claim 17, wherein the template is a test environment template applicable to testing to be performed on the device, and wherein the alternative primary profile is retrieved from the alternative address for the testing of the device and the main primary profile is retrieved from the main address for consumer use of the device.

20. The method of claim 19, wherein, when the testing of the device is complete, the alternative primary profile is deleted by at least one of:
   an automatic deletion; or
   a requested deletion.

* * * * *